Nov. 7, 1950     D. E. RATLIFF     2,529,262
SPRINKLER
Filed Jan. 3, 1947
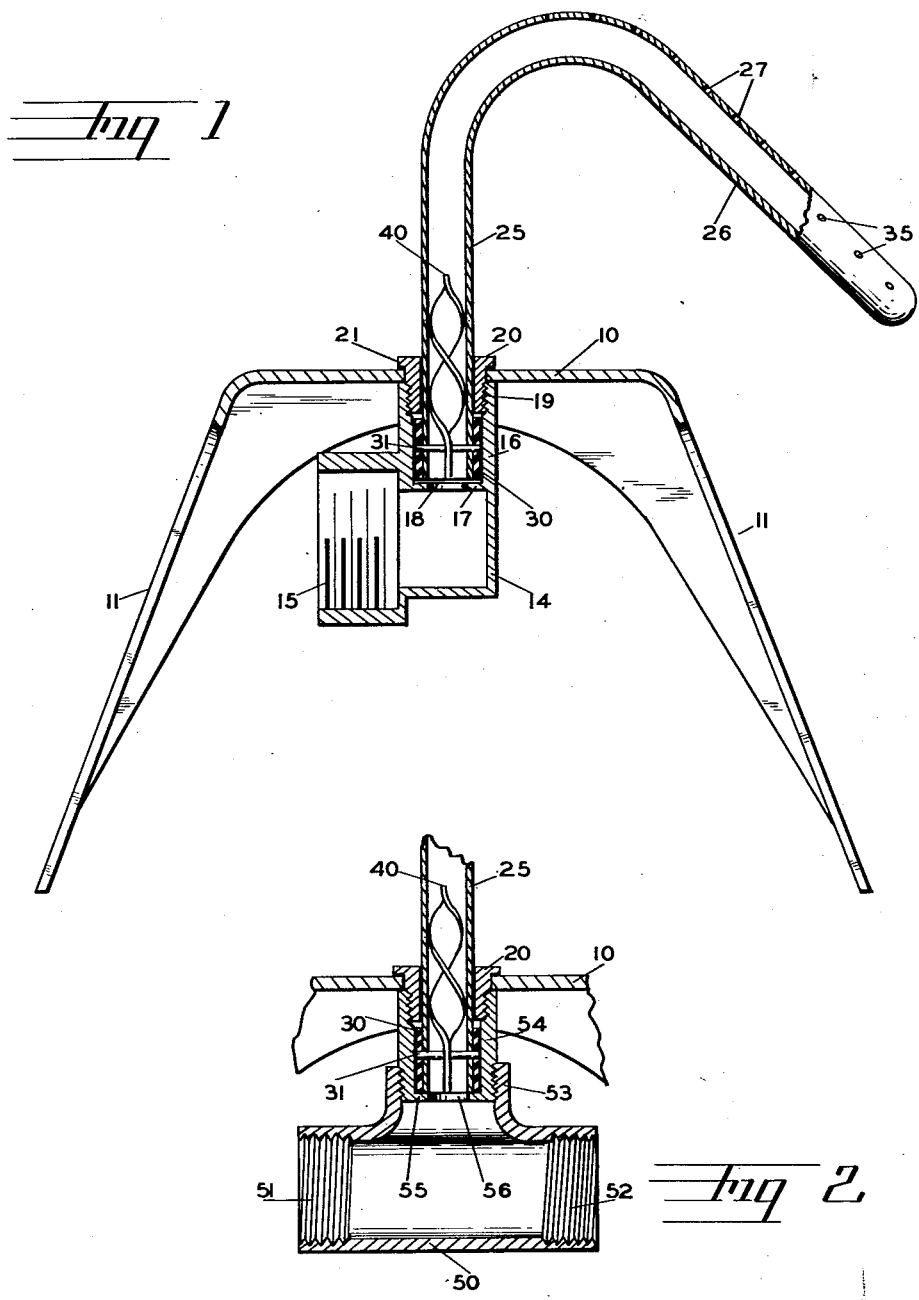
INVENTOR.
DONALD E RATLIFF Patented Nov. 7, 1950

2,529,262

UNITED STATES PATENT OFFICE 2,529,262

SPRINKLER

Donald E. Ratliff, Bend, Oreg.

Application January 3, 1947, Serial No. 720,083

2 Claims. (Cl. 299—69)

The present invention relates to a rotary sprinkler for the watering of lawns, gardens or orchards, or other uses. A feature of my invention is that one unit may be provided as the terminal piece of a hose or the like adapted to be moved from place to place, or a plurality of the sprinkling devices may be connected in series by sections of pipe or the like and temporarily or permanently located in position to sprinkle sections of a large area.

An object of the present invention is to provide a rotary sprinkler which is formed of relatively few parts which are easy to manufacture and assemble.

A further object of the present invention is to provide a rotary sprinkler device which is adaptable to a plurality of different types of mounting members, such as a standard, adapted to be moved from place to place on a lawn or garden, or a pipe fitting adapted to be held in place by the water conveying pipes associated therewith.

The objects and advantages of my present invention will be more fully understood from a study of the following specification taken in connection with the accompanying drawings, wherein like numerals refer to like parts throughout.

In the drawings Fig. 1 is a vertical section taken through the central plane of a sprinkling device embodying my invention; and Fig. 2 is a partial vertical section of a modified form of the invention.

Referring to Fig. 1 there is disclosed a rotary sprinkler comprising a supporting member including a relatively flat top portion 10 and a plurality (such as three or four) of pointed legs 11, the whole being preferably formed of a single piece of sheet metal stamped to the shape disclosed. The legs 11 are preferably of considerable length and adapted to be pressed into the ground by pushing downward or stepping upon the horizontal top portion 10 so that the sprinkler may be moved from place to place and be retained in an upright position.

A first fitting 14 is retained beneath the central portion of the top 10, the fitting comprising an elbow-shaped member including a horizontal portion having internal threads 15 therein for the reception of the end of a hose or length of pipe, and a vertical portion 16 having an internal horizontal flange 17 at the bottom thereof surrounding an opening 18 communicating with the interior of the fitting, and internal threads 19 at the top thereof and spaced from the flange 17. A removable fitting 20 is associated with the threads 19 and comprises a flange 21 adapted to overlie the portion 10 so as to clamp the fitting 14 to the standard. The internal diameter of the fitting 20 is preferably of substantially the same diameter as the opening 18. Between the flange 17 and the lower end of the fitting 20 there is thus provided a cylindrical upright bore forming a journal for the lower end of the shank portion 25 of a rotary sprinkler device including a downwardly inclined tubular portion 26 having its tip closed and having a plurality of perforations 27 in its upwardly and outwardly facing surface. The sprinkler device may be formed by sealing one end of a short length of standard tubing and bending the length of tubing around a curved form to assume the shape illustrated.

The shank portion 25 is journaled in the vertical bore provided in the fitting 14 and retained against disassociation therefrom by the threaded annular plug 20 and an enlargement provided on the outer surface of the lower end of the shank portion.

In the preferred form of the invention herein illustrated the enlargement comprises a bushing 30 of rubber tubing or the like which is fitted over the outer surface of the shank portion and suitably retained thereon. The rubber tubing may be resilient and stretched to slip over the shank portion 25 and adhered thereto so as to form a firmly bonded assembly. The rubber tubing may be fairly rigid on the other hand and will be shaped or drilled and reamed to slip easily over the end of the shank portion and will be retained thereon by retaining means comprising a pin 31 passed horizontally through holes drilled through the assembled members, the pin being adapted to be retained against endwise movement by the wall of the bore in the fitting 14. The bushing 30 is preferably formed of rubber or rubberous material but may be formed of hard plastic or resin-bonded fabric, provided the material of the bushing will not tend to adhere to the metal of the fitting 14 and will be lubricated by water from the stream of water flowing through the device. It will be noted that the internal diameter of the annular plug 20 is preferably slightly larger than the external diameter of the shank portion 25 so as to avoid excess friction.

In order to rotate the sprinkler device about the axis of the shank portion 25 I provide a plurality of laterally directed openings 35 in the tip portion 26, the reaction of the streams of water passing therethrough against the surrounding atmosphere causing the sprinkler device to rotate, and a turbine device 40. The openings 35 may be omitted and the entire force of propulsion of the sprinkler device about its vertical axis may be supplied by the turbine means 40 located within the shank portion 25 and affixed thereto.

The turbine means which provides the greater portion, or if desired all, of the rotating force, comprises a flat strip of sheet metal twisted about its longitudinal center line to provide a plurality of spiral flutes within the bore of the shank portion 25. In the preferred form I take a strip of sheet metal 40 and twist it through two complete revolutions so as to provide spiral flutes of sufficient length to provide sufficient force to rotate the sprinkler device, and retain the strip 40 within the assembly by passing the pin 31 through a hole drilled in the lower end of the strip.

In the modification disclosed in Fig. 2 the fitting 14 is eliminated and a T-coupler 50 substituted therefor, the coupler 50 being provided with threaded arms 51 and 52 adapted to receive the ends of sections of pipe or hose so that a plurality of the sprinkler devices may be retained in serial relation. The T-coupler 50 may be mounted upon a standard or may be disassociated from a standard and retained in proper position by the rigidity of the joining pipes. The T-leg 53 of the coupler 50 is adapted to extend vertically as illustrated and receive therein the lower end of a fitting 54 having external threads thereon to engage with the threads of the leg 53. The fitting 54 is provided with a lower flange 55 annularly surrounding an opening 56 and upper internal threads spaced from the flange 55 to retain an annular plug 20 having a central bore large enough to journal the shank 25 of a rotary sprinkler device. The space between the flange 55 and the plug 20 is of larger diameter and is adapted to retain the external bearing sleeve 30 fixed to the shank 25 by the pin 31, as previously described. The pin 31 also passes through the turbine device 40, as previously described, and the rotary sprinkler device is otherwise as disclosed with respect to Fig. 1.

I have thus provided a rotary sprinkler device which may be made in a plurality of forms by the use of interchangeable parts. It will be appreciated that the form illustrated in Fig. 2 is almost entirely the same as the form illustrated in Fig. 1, it being only necessary to eliminate the coupling fitting 14 and substitute therefor the fitting 54 and the T-coupling 50. Of the last two mentioned members only one need be fabricated as the T-coupling 50 is a standard part available in any plumbing or hardware shop. The annular plug 20 is also a standard fitting member. Accordingly parts which need be manufactured are very few in number and comprise the sprinkler tube, the turbine strip, the bearing member 30 and the pin 31, all of which are usable in any form of the invention, and the coupling member 14 or the fitting 54 which are interchangeable and may be manufactured by simple operations in lesser quantities than the other parts. Likewise the standard for supporting the sprinkler device may be manufactured in lesser number than the other parts and will be supplied with the sprinkler device as ordered. When the form illustrated in Fig. 2 is to be used in connection with a rigid group of pipes permanently located throughout a garden or orchard, the standards may be omitted, but if it is desired that the form illustrated in Fig. 2 be utilized in connection with hose or the like the standards may be associated therewith merely by removing the plug 20, withdrawing the shank portion from the fitting 54, and then reassembling the members to retain them in proper association with the standard.

It is to be appreciated that the present invention will not wear out as has been the case with all prior sprinkler devices within my knowledge, such wearing taking place at the adjacent rotating and non-rotating surfaces so that eventually the entire sprinkler must be discarded. By making the bearing member 30 of material which may be slipped from the shank of the sprinkler portion and by the use of a loose pin 31 I am able to prolong the life of a sprinkler device merely by replacing a worn or damaged bearing member 30.

Having illustrated and described a preferred embodiment of my invention, it should be apparent to those skilled in the art that the invention permits of modifications in detail and arrangement. All such modifications as come within the true spirit and scope of the appended claims are considered to be a part of my invention.

I claim:

1. A rotary sprinkler comprising a supporting member comprising a flat top portion having an opening therethrough, a first fitting having its upper end engaging the lower surface of said top portion and surrounding said opening, said first fitting having internal threads near its upper end, an adjacent smooth bore portion, and an internal flange at the lower end of said smooth bore portion, a second fitting disposed in said opening and having external threads engaging said internal threads and an external flange engaging the upper surface of said top portion, and a rotatable sprinkler device having its lower end coaxially disposed within said fittings, said sprinkler device comprising a bearing sleeve disposed in the space defined by said smooth bore portion, and said internal flange and the lower end of said second fitting overhanging the ends of said bearing sleeve to retain said sprinkler device in position.

2. A rotary sprinkler comprising a support, a rotatable spraying device mounted on said support and including a tubular shank portion disposed with its axis substantially vertical, a short section of rubber tubing snugly surrounding the lower end of said shank portion, attaching means holding said section onto the outer surface of said shank portion, and means journaling said shank portion comprising an externally threaded fitting mounted in upright position on said support and loosely journaling said shank portion above the upper end of said section, an internally threaded fitting threadedly associated with said externally threaded fitting and comprising a portion loosely journaling said section and an internal flange underlying said section to support said spraying device, the lower end of said externally threaded fitting providing an upper flange to retain said spraying device against the thrust of water flowing therethrough, said spraying device comprising a twisted strip of sheet material disposed within the bore of said shank portion, and said attaching means comprising a pin passing through said section, said shank portion and said strip.

DONALD E. RATLIFF.

REFERENCES CITED

The following references are of record in the file of this patent:

UNITED STATES PATENTS

| Number | Name | Date |
|---|---|---|
| 182,413 | Chase | Sept. 19, 1876 |
| 370,922 | Best | Oct. 4, 1887 |
| 554,628 | Rocholl | Feb. 11, 1896 |
| 575,966 | Main | Jan. 26, 1897 |
| 1,649,179 | Orr | Nov. 15, 1927 |
| 1,876,250 | Lassen et al. | Sept. 6, 1932 |
| 2,310,796 | Lappin | Feb. 9, 1943 |

FOREIGN PATENTS

| Number | Country | Date |
|---|---|---|
| 22,889 of 1929 | Australia | Oct. 21, 1930 |
| 115,063 | Australia | May 14, 1942 |
| 15,475 of 1933 | Australia | July 12, 1934 |